(12) United States Patent
Fried

(10) Patent No.: US 11,261,040 B2
(45) Date of Patent: Mar. 1, 2022

(54) APPARATUS TO CONVEY PULVERIZED MATERIAL

(71) Applicant: FLSmidth A/S, Valby (DK)

(72) Inventor: Andrew Charles Fried, Slatington, PA (US)

(73) Assignee: FLSmidth A/S

( * ) Notice: Subject to any disclaimer, the term of this patent is extended or adjusted under 35 U.S.C. 154(b) by 0 days.

(21) Appl. No.: 17/278,614

(22) PCT Filed: Sep. 17, 2019

(86) PCT No.: PCT/IB2019/057830
§ 371 (c)(1),
(2) Date: Mar. 22, 2021

(87) PCT Pub. No.: WO2020/058853
PCT Pub. Date: Mar. 26, 2020

(65) Prior Publication Data
US 2022/0033200 A1 Feb. 3, 2022

Related U.S. Application Data

(60) Provisional application No. 62/732,826, filed on Sep. 18, 2018.

(51) Int. Cl.
*B65G 53/48* (2006.01)
*B65G 53/08* (2006.01)

(52) U.S. Cl.
CPC ............. *B65G 53/08* (2013.01); *B65G 53/48* (2013.01)

(58) Field of Classification Search
CPC ........ B65G 53/08; B65G 53/40; B65G 53/48; B65G 53/525

USPC ....................... 406/53, 56, 61, 144
See application file for complete search history.

(56) References Cited

U.S. PATENT DOCUMENTS

| | | | | |
|---|---|---|---|---|
| 1,450,903 A | * | 4/1923 | Newhouse | ............ F23K 3/00 406/30 |
| 1,553,539 A | | 9/1925 | Konyon | |
| 1,948,812 A | * | 2/1934 | Williams | .............. F23K 3/04 406/61 |
| 2,127,693 A | | 8/1938 | McCanless et al. | |

(Continued)

OTHER PUBLICATIONS

International Search Report and Written Opinion dated Nov. 29, 2019, 10 pages.

*Primary Examiner* — Joseph A Dillon, Jr.
(74) *Attorney, Agent, or Firm* — Jeffrey A. Sharp

(57) ABSTRACT

A conveyor for pulverized material comprises in combination a conduit, a screw rotatably mounted within the conduit having an material inlet end and material discharge end, means for rotating the screw, means for supplying material to the screw at the material inlet end, whereby the material will be compacted as it is advanced by the screw to the material discharge end, and means for admitting a gas under pressure to the compacted material at the material discharge end to render it fluent. In a portion of the screw a material seal is formed by the compacted material being advanced by the screw, wherein there are material pockets formed between adjacent screw flights, wherein the pocket size volume is at its maximum nearest the material inlet end and at its minimum nearest the material outlet end, with at least twice as many pockets of minimum size as of maximum size.

4 Claims, 5 Drawing Sheets

(56) References Cited

U.S. PATENT DOCUMENTS

| | | | | |
|---|---|---|---|---|
| 2,299,565 A * | 10/1942 | Colburn | B65G 53/4616 | 406/61 |
| 2,315,079 A * | 3/1943 | Reeves | B65G 53/08 | 406/61 |
| 2,614,892 A * | 10/1952 | Cherewick | B65G 53/08 | 406/61 |
| 3,004,799 A * | 10/1961 | Tikal | B65G 53/58 | 406/55 |
| 3,099,496 A * | 7/1963 | Kayser | B65G 53/08 | 406/19 |
| 3,370,890 A * | 2/1968 | Morgan | B28C 7/062 | 406/61 |
| 3,377,107 A * | 4/1968 | Hodgson | B65G 53/30 | 406/47 |
| 3,602,552 A * | 8/1971 | Morgan | B65G 53/08 | 406/60 |
| 3,712,681 A * | 1/1973 | Marino | B65G 53/08 | 406/48 |
| 3,717,752 A * | 2/1973 | Warning | A21C 15/002 | 239/654 |
| 3,778,522 A * | 12/1973 | Strommer | A23J 3/26 | 426/511 |
| 3,975,058 A * | 8/1976 | York | B65G 53/48 | 406/60 |
| 4,116,368 A * | 9/1978 | Smith | E04G 23/0203 | 222/145.5 |
| 4,138,162 A * | 2/1979 | Noren | E04C 21/04 | 406/61 |
| 4,279,556 A * | 7/1981 | Ronning | B65G 53/48 | 406/53 |
| 4,391,561 A * | 7/1983 | Smith | B65G 53/48 | 198/661 |
| 4,500,228 A * | 2/1985 | McDonald | B65G 53/08 | 406/61 |
| 4,502,820 A * | 3/1985 | Fujii | B65G 53/08 | 222/272 |
| 4,511,284 A * | 4/1985 | Sterner | E01C 19/1022 | 239/654 |
| 4,525,106 A * | 6/1985 | DiBuo | B65G 53/48 | 406/60 |
| 4,711,607 A * | 12/1987 | Wynosky | B65G 53/08 | 406/30 |
| 4,726,715 A * | 2/1988 | Steen | B65G 53/08 | 198/550.1 |
| 4,881,862 A * | 11/1989 | Dick | B65G 53/48 | 414/218 |
| 5,240,185 A * | 8/1993 | Kaiju | B05B 5/1683 | 239/690 |
| 5,505,567 A * | 4/1996 | Scott | A21C 11/16 | 406/106 |
| 5,615,987 A * | 4/1997 | Weist | B65G 53/48 | 137/514 |
| 5,634,713 A * | 6/1997 | Abe | B01F 13/0211 | 366/102 |
| 5,681,132 A * | 10/1997 | Sheppard, Jr. | B65G 53/48 | 406/61 |
| 6,220,486 B1 * | 4/2001 | Teramachi | B05B 7/144 | 222/195 |
| 7,850,904 B2 * | 12/2010 | Osato | B09B 3/00 | 422/1 |
| 7,976,259 B2 * | 7/2011 | Craig | C12M 21/04 | 414/218 |
| 8,011,861 B2 * | 9/2011 | Sprouse | C10J 3/50 | 406/53 |
| 8,282,332 B2 * | 10/2012 | Nill | B01J 8/003 | 414/158 |
| 8,534,443 B2 * | 9/2013 | Boyce | B65G 65/28 | 198/303 |
| 8,784,072 B2 * | 7/2014 | Burke | B30B 11/225 | 417/203 |
| 9,604,794 B2 * | 3/2017 | Hauser | B65G 33/14 | |
| 9,845,206 B1 * | 12/2017 | Baranovski | B05B 7/1463 | |
| 10,351,361 B2 * | 7/2019 | Bartholomew | B65G 67/606 | |
| 10,717,612 B2 * | 7/2020 | Rickers | F04C 13/002 | |
| 2003/0190200 A1 * | 10/2003 | Hajima | B65G 53/08 | 406/191 |
| 2006/0002774 A1 * | 1/2006 | Stumborg | B65G 53/14 | 406/57 |
| 2007/0028976 A1 * | 2/2007 | Lane | B65G 53/58 | 137/806 |
| 2013/0322972 A1 * | 12/2013 | Lloyd | B65G 53/08 | 406/61 |
| 2014/0021224 A1 * | 1/2014 | Massicotte | G01F 13/005 | 222/333 |
| 2019/0283981 A1 * | 9/2019 | Rickers | F04C 2/1073 | |
| 2020/0197847 A1 * | 6/2020 | Jantes | B04C 5/04 | |
| 2021/0107746 A1 * | 4/2021 | Schnittger | E04G 21/0436 | |

* cited by examiner

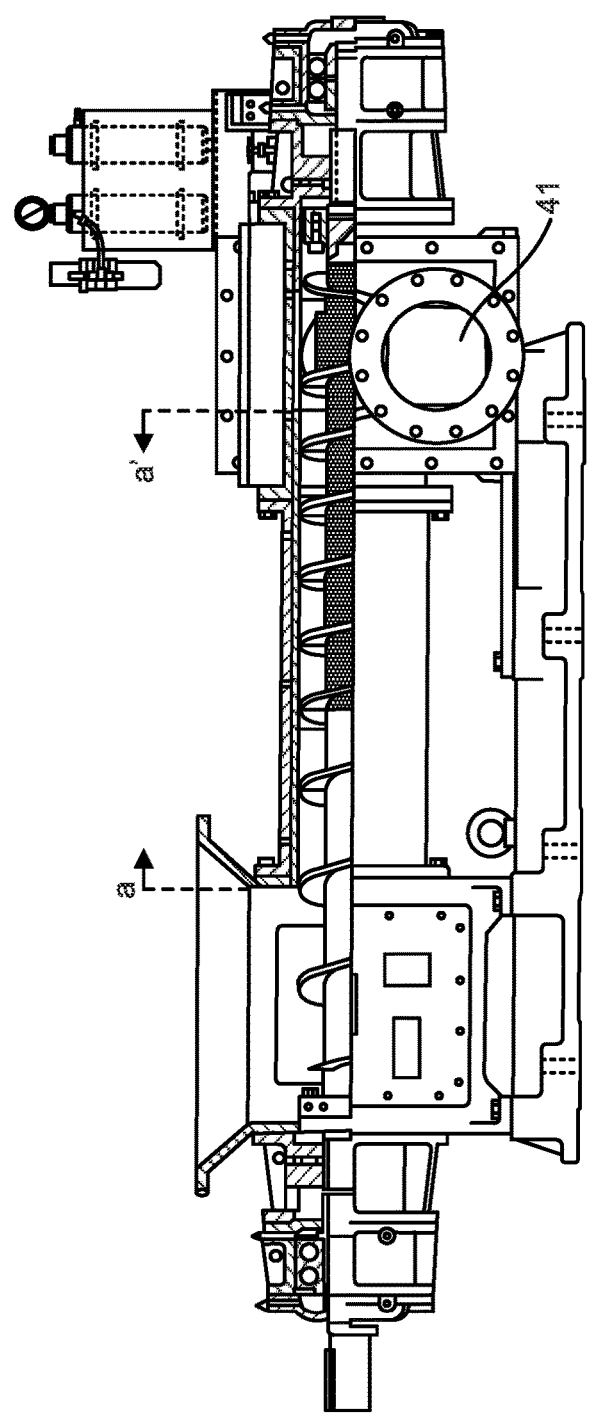
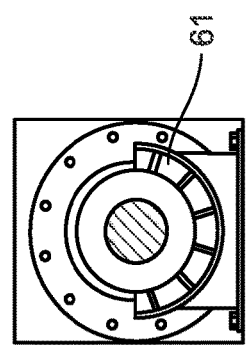
FIG. 3
FIG. 4

APPARATUS TO CONVEY PULVERIZED MATERIAL

BACKGROUND OF THE INVENTION

Screw pumps in which dry pulverized, free-flowing materials are mixed with air in the pump discharge housing to impart a flowing, liquid-like condition to the materials being conveyed are known in the art. In such a fluidized condition, pulverized materials can move through a pipeline situated downstream from the pump, which potentially extends for distances up to 4,500 feet, as a relatively dense column and at low velocity by the kinetic energy of expanding compressed air and the displacement of the material into the pipeline by the pump itself. Such a screw pump is shown in U.S. Pat. No. 1,553,539 to Kinyon, dated 15 Sep. 1925 and fully incorporated herein by reference. In one embodiment there is shown the pump comprised in part a single screw with flights of slightly decreasing pitch toward the material discharge end to form a continuous positive seal or choke, with air supplied through an air ring beyond the terminal flight of the screw.

The design of such a screw pump has been remarkedly viable over the years, although it has been subject to incremental improvements. For example, in the 1980-1990 era pressurization was adopted to the bearing housings or the discharge bearing housing of various embodiments of the screw pump described above as a means to prevent material from migrating into the bearing area and causing premature bearing failure. This significantly reduced bearing failures, lowering maintenance costs and pump downtime. In 1999 a two-piece and three-piece split screw design were introduced to allow the end user to replace only a portion of the pump screw faster and at a lower material cost.

The object of the present invention is to continue making improvements to the screw pump design in order to improve the power consumption and capacity of the conveyor.

These and other objects are realized by the present invention as illustrated in the Figures, in which FIG. 1 is a side elevation view of the original prior art device and is presented for illustrative purposes.

FIG. 3 is a side elevation view, partly cutaway, of one embodiment of the device of the present invention.

FIG. 4 is a section along the line E-E of FIG. 2.

Figure 1:
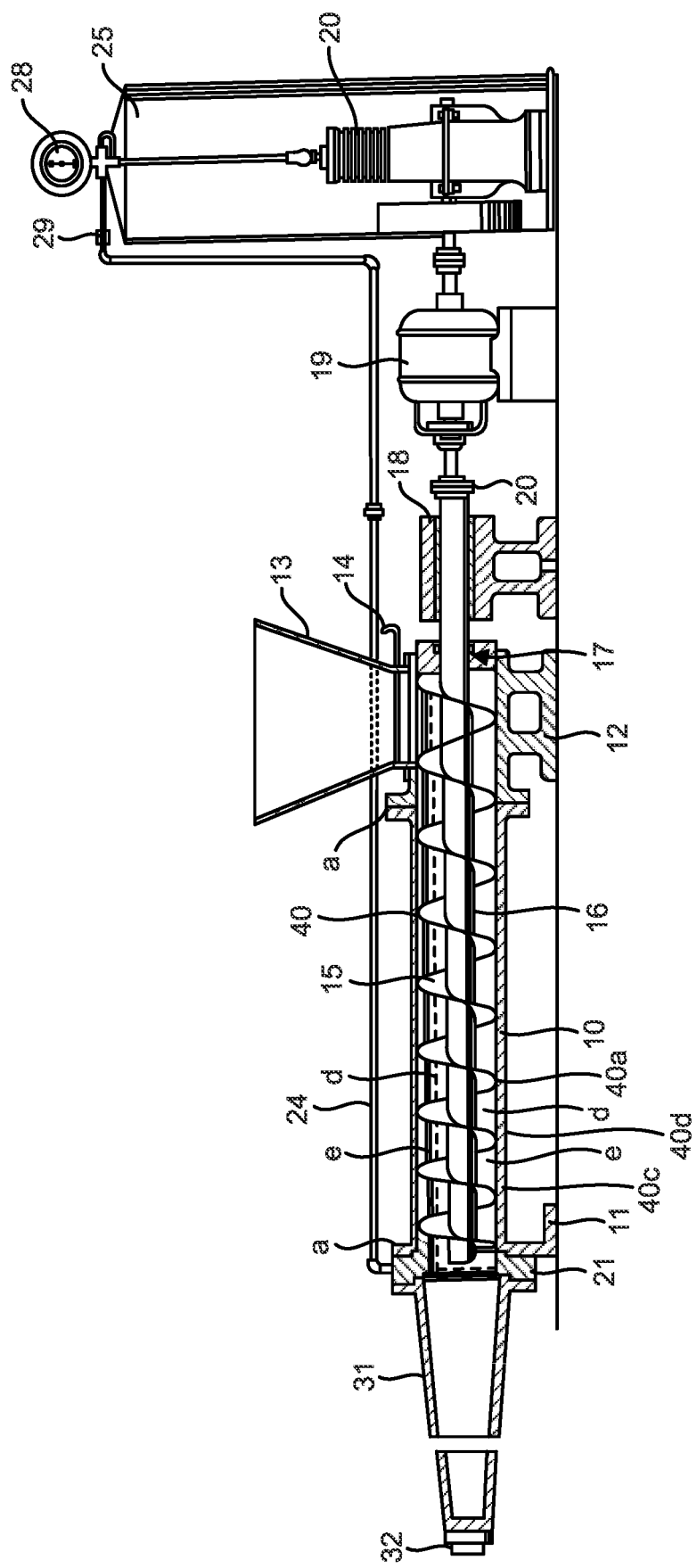

In the form of the prior art apparatus shown in FIG. 1, 10 is a cylindrical casing provided at one end with a supporting foot 11 and connected at the other end to a standard 12, having a cylindrical bore of the same diameter as the interior of the casing. The length of the casing extending from point a to point a' in FIG. 1, and FIG. 3, defines the barrel of the cylindrical casing, which is that portion of the casing in which the screw is closely fitted to the interior walls of the casing so that when material is being transported therethrough a material seal is formed that hinders the passage of transporting air through the bore from the forward end of casing 10, that is, that portion of the casing closest to supporting foot 11 and the material discharge.

Above the bore is a hopper 13 of any suitable shape and capacity provided with a valve or other form of controlling device 14 by which the discharge of pulverized material from the hopper may be regulated. Extending through the casing 10 is a screw conveyor 15, the shaft 16 of which. projects through a suitable bushing 17 which also serves as a closure for the outer end of the bore. The shaft is continued through a bearing 18 which constitutes the main support for the shaft. The end of the shaft is connected to an electric motor 19 or other source of power, and preferably the connection should be in the form of a flexible coupling 20.

The screw will contain a plurality of flights 40. In the illustration the pitch of the screw conveyor 15 (defined as the distance from the midpoint of a flight to the midpoint of the next adjacent flight located in the direction of the movement of material through the screw) decreases from the end at which material is supplied to the end from which it is discharged. The purpose of this arrangement is to compress the pulverized material as it approaches the discharge end of the screw, so that the material will act as a seal to prevent the fluid which is introduced into the material as it leaves the screw from flowing through the casing toward the hopper and aerating the material before it has been discharged from the screw. The actual volume of the compressive region between adjacent flights, and not the pitch, will determine the degree of compression of the material being conveyed. For example, in FIG. 1 three adjacent flights 40a, 40b and 40c are situated in the direction of material flow through the conveyor, i.e. as it moves from hopper 13 toward tapering casing or chamber 31. The compressive region d between flights 40a and 40b is that volume in the space extending from the leading wall of flight 40a to the trailing wall of flight 40b, and the compressive region e between flights 40a and 40b is that volume in the space extending from the leading wall of flight 40b to the trailing wall of flight 40c. For the purposes herein, the compressive region between adjacent flights is referred to herein as a "pocket", as therefore with specific reference to FIG. 1, compressive region d between flights 40a and 40b is alternatively referred to as pocket d and the compressive region e between flights 40b and 40c is alternatively referred to as pocket e.

For the purpose of introducing fluid into the material there is attached to the forward end of casing 10 an annular casting 21. Into one end of the passage there is screwed one end of a pipe 24 leading to a tank 25 in which the fluid that is to be injected into the material may be compressed by a suitable compressor 26 which may be driven by the motor 19 that drives the screw conveyor. The tank 25 may be provided with a pressure gauge 28, and a suitable regulating valve 29 can be inserted in the pipe 24 to control the amount of fluid supplied to the material.

Fluid is introduced into the pulverized material through a series of forwardly directed ports (not shown). Attached to the front face of annular casting 21 is a tapering casing or chamber 31 to the outer end of which is connected a pipe 32 through which the pulverized material is distributed. The pipe 32 may be provided with branches in case the material is to be conveyed to a number of points. Later versions of the prior art device, rather than discharging the material straight ahead and in line with the screw centerline as shown in FIG. 1, discharge the material to the right or the left and perpendicular to the screw centerline. This is shown in outlet 41 as set forth in FIGS. 2 and 3.

Pursuant to the present invention, it has been discovered that the performance of the screw pump is improved when the compression volume decreases along the length of the screw according to specific parameters. Specifically, to create a better seal inside the barrel of the screw pump, often compression is used. This is where the pitch of the screw, and more specifically the volume of the pocket between each adjacent flight, decreases as it nears the discharge end. This reduction of area squeezes material against the screw and barrel to form a material seal. By keeping the material at this reduced volume for a longer distance a better seal can be formed. To do this a screw was made with less intake size (larger) pitch flights and more of the discharge (smaller) sized flights.

By increasing this seal distance, a better seal is formed and energy consumption is reduced. Adding addition smaller sized flights necessitated extending the screw and barrel length which aided in a better barrel seal by dramatically increasing the distance a seal could be made with smaller pitch size discharge end flights.

Not only did these modifications improve energy efficiency, it also significantly boosted the operating pressure range of the pump.

Figure 5:
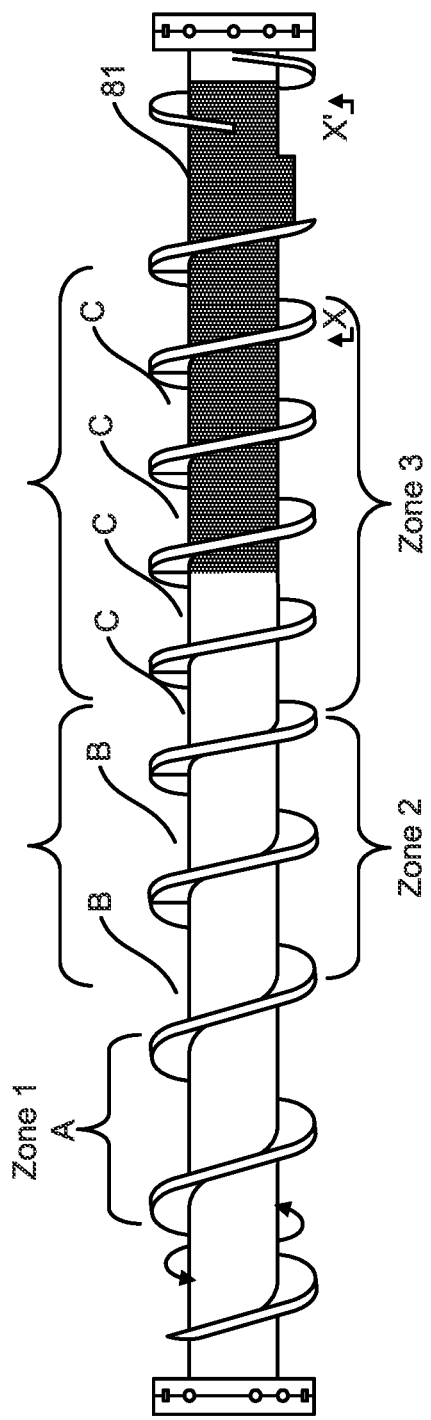
FIG. 5 is a view of a new screw design of the present invention.

According to the present invention, in the screw pump there are three specific volume zones of pockets as the material travels from the inlet of the barrel to the barrel outlet, constituting Zone 1, located in that portion of the screw barrel closest to the material inlet and which comprises a first pocket represented as pocket A and having the largest volume, zone 2, comprising one or more pocket(s) B, with each having an intermediate volume less than that of pocket A, and zone 3, located in that portion of the screw barrel closest to the material outlet comprising a plurality of pockets C and having the smallest average volume relative to the pockets in the other zones. Accordingly, in zone 3 there occurs the maximum compression of the material. One example of the various pockets and zones are also shown in FIG. 5.

With regard to the number of pockets in each zone, in zone 1 there is one pocket A, in zone 2 there is one or two pockets B, and in zone 3 there is at least two pockets, and preferably one more pocket than is in Zone B and most preferably at least two more pockets then there are in Zone 2. There are at least twice the number of zone 3 pockets than there are zone 1 pockets.

In terms of the relative volume of each pocket, each pocket B will have a volume ranging from about 70% to about 90% of the volume of pocket A, and each pocket C will have a volume ranging from about 70% to about 95%, and preferably from about 74% to about 85%, of the volume of each pocket B. Accordingly, each pocket C will have a volume of about 50% to about 85%, and preferably from about 52% to about 77%, of the volume of pocket A.

It is preferred that, within a given zone when the pockets are of different volumes, i.e. they vary between the maximum and minimum values within each zone, the pockets be arranged within the barrel from the material inlet area of the barrel to the material outlet area in order of decreasing volume. When the difference in volume between adjacent pockets within a zone is negligible, i.e. up to about 5%, placing a smaller pocket before a larger one when moving from the material inlet to outlet may not result in a measurable decrease in performance—however, as the difference in volume between the pockets in a specified zone increases performance will be negatively affected if the pockets are not arranged from maximum to minimum volume as they progress toward the material outlet.

In order to extend the barrel to accommodate an increased number of the smallest volume pockets the barrel was lengthened by 50%, increasing the Length/Diameter ratio from 3.3 to 5.0. Two screws were fabricated to test the longer barrel modification. The screws contained, respectively, three (for the first screw) and four (for the second screw) consecutively placed smaller pockets having a pitch of 100 mm that were situated adjacent to the material outlet end of the barrel.

The first screw had flights with the following pitches: 150 mm>130 mm>115 mm>(3) 100 mm flights. The second screw had flights with the following pitches: 150 mm>125 mm>(4) 100 mm flights.

In testing, Volumetric Efficiency (throughput rate) increased for both screw designs and energy consumption was significantly lowered.

The new designs resulted in maximum power ratings much lower than the standard style pump. The total power requirements reduced (best cases) from about 15% to about 30%.

While improved results were shown utilizing the standard-length barrel with the modified pocket dimensions, a longer barrel allows for further seal distance, and a more gradual decrease in flighting. By increasing the length of barrel seal and adjusting the screw designs it is throughput and energy consumption at higher line pressures and above will benefit greatly.

There are additional differences between the present invention's discharge housing and the standard housing of the prior art design. In one embodiment of the present invention, the housing does not have nozzles for air supply but rather an open rectangular area for the air to flow and mix with the material.

Figure 2:
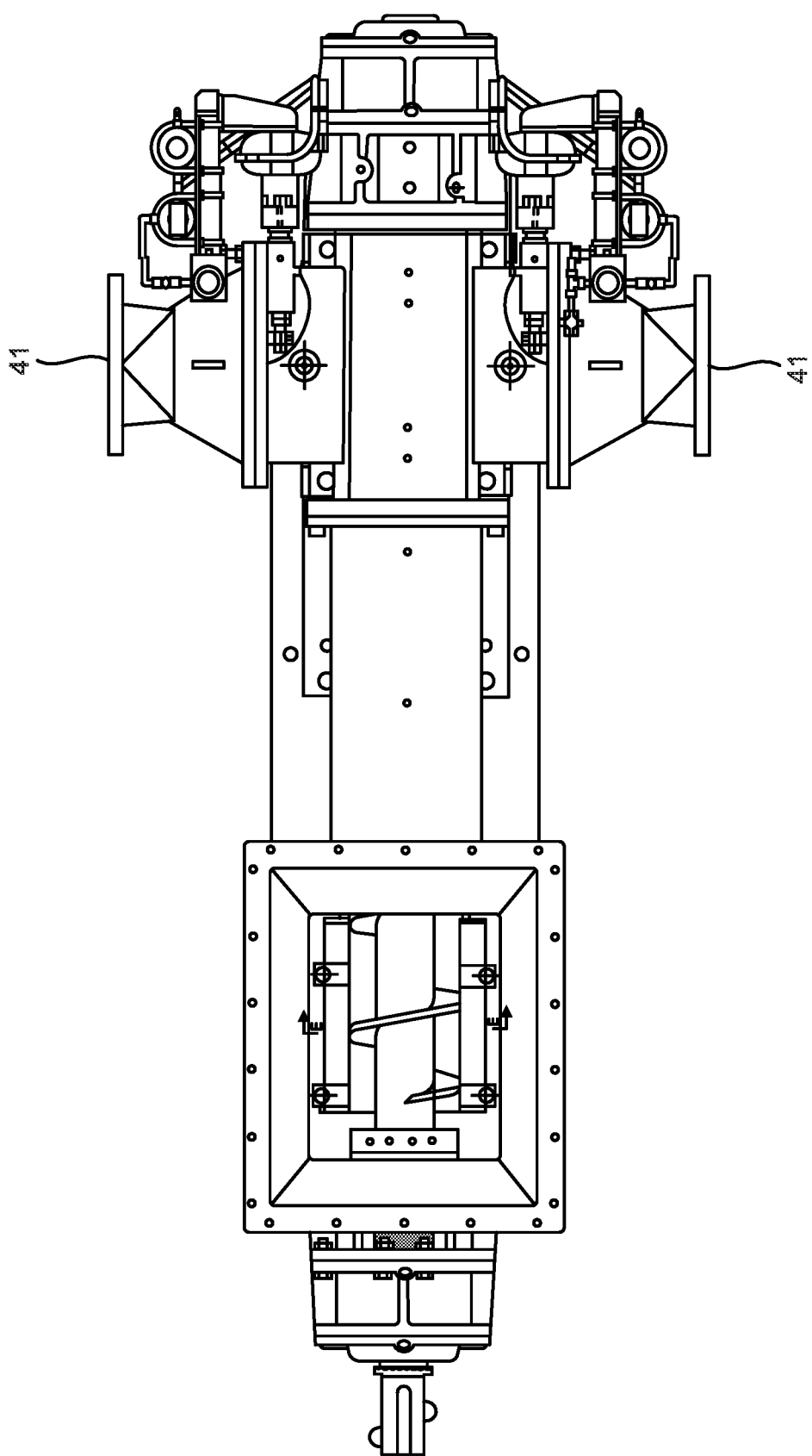
FIG. 2 is a plan view of the device of the present invention.
Figure 6:
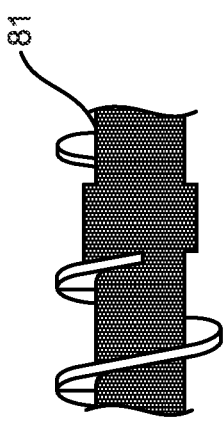
FIG. 6 is a view of the section of the screw extending from X to X' on FIG. 5.

The embodiment set forth in FIGS. 2 and 3 shows the discharge housing as a dual flapper (exit) valve setup, where material exits both sides of the screw into the air stream running underneath the pump. As indicated, this setup forgoes using nozzles. As further show in FIGS. 5 and 6, hard facing 81 may be applied to the screw surface to extend its useful life.

As indicated, the screw pump of the type described utilizes a screw to drive material forward from an area of low pressure (near atmospheric) to higher pressure to charge a pneumatic convey line. A rotating screw uses the friction of a stationary wall to drive the material forward. Currently, material in the inlet hopper is allowed to build up and surround the screw from all sides.

Figure 7:
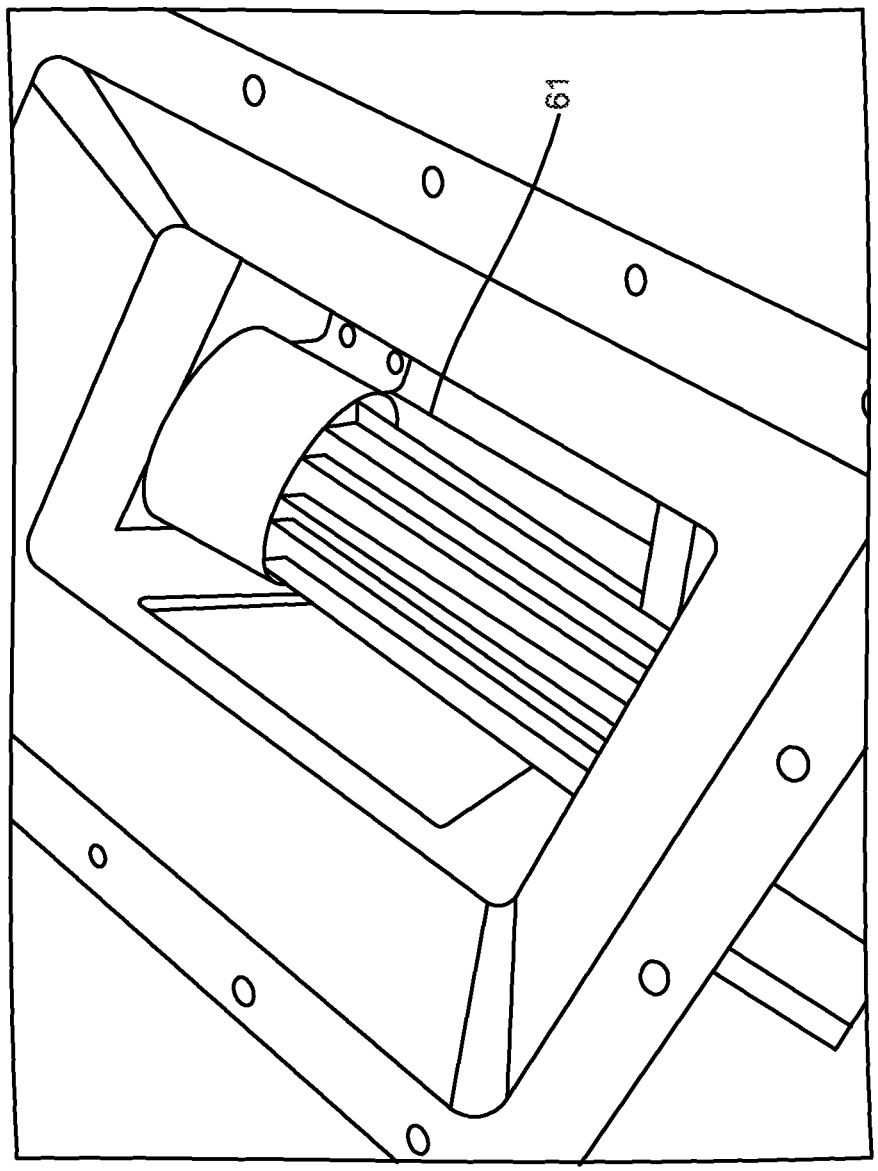
FIG. 7 is one embodiment of a material inlet according to the invention.

The bulk materials typically conveyed, with a screw type pump, flow and move easily so keeping the material stationary underneath the screw helps partially reduce localized turbulence/movement. Placing a stationary surface in close proximity to the bottom side of the screw has the effect of the screw driving material into the barrel more efficiently, which increases capacity. This has been accomplished with the ribbed trough device as shown as 61 in FIGS. 4 and 7.

Alternatively, a smooth walled trough kept in very close proximity to the screw may be utilized to increase capacity.

What is claimed is:

1. A conveyor for pulverized material comprising the combination of a conduit, a screw rotatably mounted within the conduit having an material inlet end and material discharge end, means for rotating the screw, means for supplying material to the screw at the material inlet end, whereby the material will be compacted as it is advanced by the screw to the material discharge end, means for admitting a gas under pressure to the compacted material at the material discharge end to render it fluent whereby the material will be conveyed through a conduit connected to the material discharge end of the screw by the pressure thus applied, wherein in a portion of the screw there a material seal is formed by the compacted material advanced by the screw thus preventing gas from traveling from the material discharge to the material inlet, and wherein in the material seal forming portion of the screw there are material pockets formed between adjacent screw flights, wherein the material pocket closest to the material inlet has the maximum volume of any material pocket, with the material pockets having the minimum volume being in the material seal forming portion of the screw nearest the material discharge end, and wherein there are at least two of such minimum volume pockets located in the material seal forming portion of the screw nearest the discharge end, with each pocket having a volume of about 50% to about 85% of the volume of the maximum size pocket.

2. The conveyor of claim 1 wherein there are at least three minimum sized pockets.

3. The conveyor of claim 2 wherein each minimum size pocket has a volume of about 52% to about 77% of the volume of the maximum size pocket.

4. The conveyor of claim 1 wherein there is at least one pocket located in material seal forming portion of the screw intermediate the minimum volume pockets and the maximum volume pockets, said at least one intermediately located pocket having a volume greater than the volume of any of the minimum volume pockets but less than the volume of the maximum volume pocket.

* * * * *